(12) United States Patent
Chartoff et al.

(10) Patent No.: US 6,423,260 B1
(45) Date of Patent: Jul. 23, 2002

(54) METHODS AND APPARATUS FOR PRODUCING ORDERED PARTS FROM LIQUID CRYSTAL MONOMERS

(75) Inventors: Richard P. Chartoff, Cincinnati, OH (US); John W. Schultz, Alpharetta, GA (US); Jill S. Ullett, Dayton, OH (US)

(73) Assignee: University of Dayton, Dayton, OH (US)

( * ) Notice: Subject to any disclaimer, the term of this patent is extended or adjusted under 35 U.S.C. 154(b) by 0 days.

(21) Appl. No.: 09/531,736

(22) Filed: Mar. 21, 2000

Related U.S. Application Data

(63) Continuation-in-part of application No. 09/128,078, filed on Aug. 3, 1998, now Pat. No. 6,117,385
(60) Provisional application No. 60/055,104, filed on Aug. 6, 1997.

(51) Int. Cl.[7] .......................... B29C 35/08; B29C 41/02
(52) U.S. Cl. ...................... 264/401; 264/435; 264/494
(58) Field of Search ............................. 264/308, 401, 264/435, 494

(56) References Cited

U.S. PATENT DOCUMENTS

| 4,810,433 A | 3/1989 | Takayanagi et al. |
| 5,073,294 A | * 12/1991 | Shannon et al. ........ 252/299.01 |
| 5,359,253 A | * 10/1994 | Hikmet .................... 264/435 X |
| 5,545,367 A | 8/1996 | Bae et al. |
| 5,789,521 A | 8/1998 | Marrocco et al. |
| 5,948,486 A | * 9/1999 | Sage et al. ............. 252/299.01 |

FOREIGN PATENT DOCUMENTS

| JP | 62-70406 A | | 3/1987 |
| JP | 01113728 A | * | 5/1989 |

* cited by examiner

*Primary Examiner*—Leo B. Tentoni
(74) *Attorney, Agent, or Firm*—Killworth, Gottman, Hagan & Schaeff, L.L.P.

(57) ABSTRACT

A method and apparatus for producing ordered parts by from non-ordered liquid crystal monomers. Liquid crystal monomers contain stiff, rod-like mesogenic segments which can be aligned by an external force such as shear, electric field or magnetic field, causing an anisotropy in properties. When cured in the aligned stated by photopolymerizing the aligned monomers the anisotropic structure is "locked in" resulting in materials with anisotropic physical and mechanical properties. The rigid structure of the mesogenic segments can result in cured networks with high glass transition temperatures if the spacer groups which connect the mesogenic core with the reactive end groups are kept short. Glass transition temperatures of postcured parts ranged from 75 to 148° C. depending on resin and processing conditions. A mechanical anisotropy on the order of two was measured for aligned samples.

8 Claims, 16 Drawing Sheets

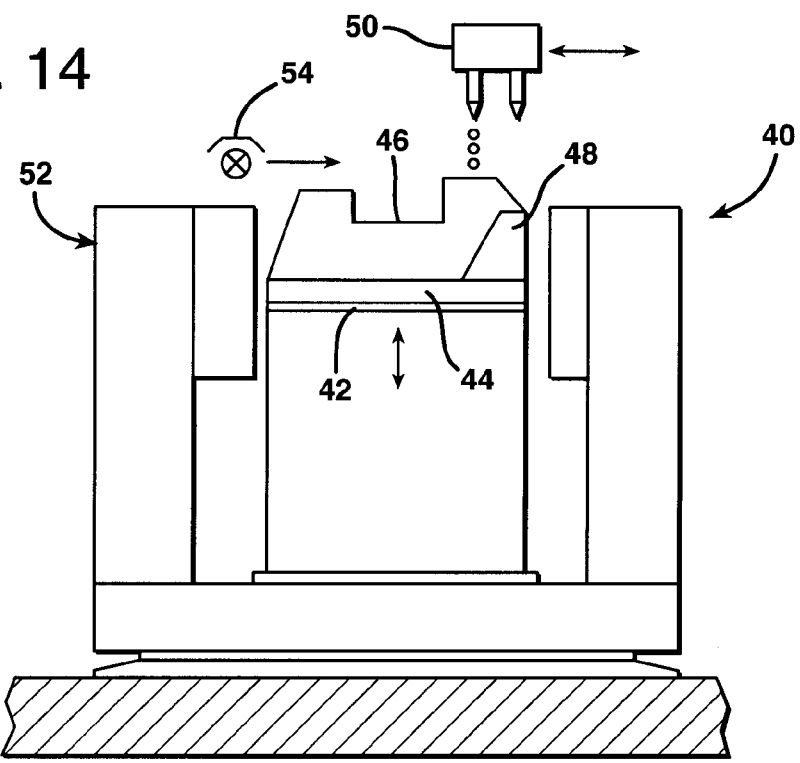
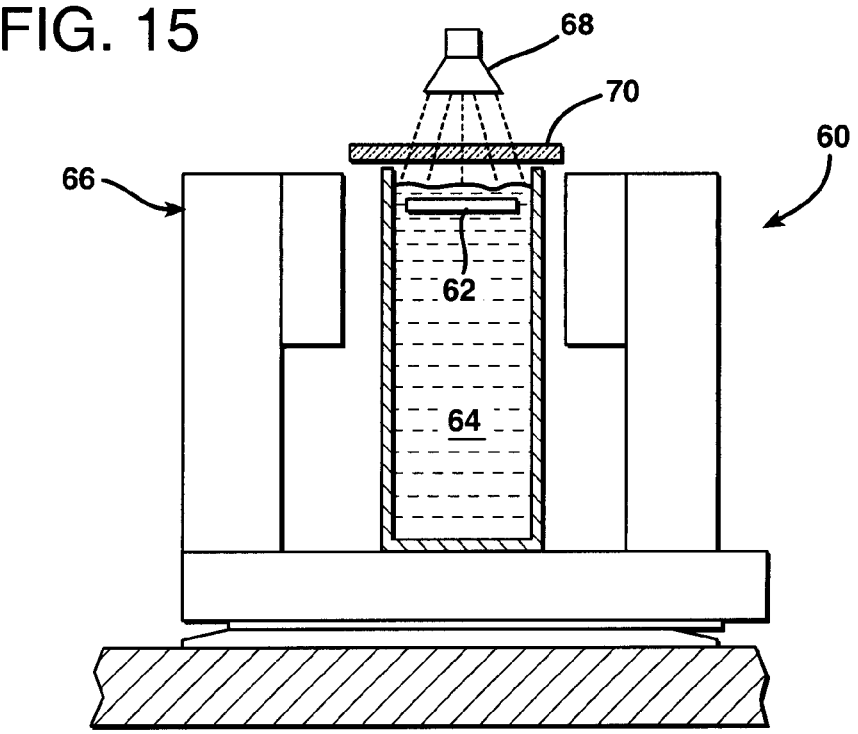

METHODS AND APPARATUS FOR PRODUCING ORDERED PARTS FROM LIQUID CRYSTAL MONOMERS

CROSS-REFERENCE TO RELATED APPLICATIONS

This application is a continuation-in-part of U.S. application Ser. No. 09/128,078, filed Aug. 3, 1998, now U.S. Pat. No. 6,117,385, issued Sep. 12, 2000, which in turn claims the benefit of U.S. Provisional Application No. 60/055,104, filed Aug. 6, 1997. Reference is also made to related U.S. application Ser. No. 09/266,231, filed Mar. 10, 1999, which in turn claims the benefit of U.S. Provisional Application No. 60/077,467, filed Mar. 10, 1998 for "Rigid-Rod Monomers for Polymers in Rapid Prototyping and Composites," the disclosure of which is hereby incorporated by reference.

BACKGROUND OF THE INVENTION

The present invention relates to a method and apparatus for producing ordered parts from liquid crystal monomers. More particularly, it relates to a method and apparatus for providing ordered parts from non-ordered liquid crystal monomers by stereolithography, photolithography, ink jet deposition, or other systems.

The applications for built parts, such as those produced by stereolithography, have grown from simple visualization of engineering designs to fabrication of functional end-use prototypes. With the growth of applications has come a need for higher performance resins. In particular, the upper-use temperatures of cured resins needs to approach or exceed 200° C. for applications such as directly formed molds for injection molding, and under-the-hood automotive applications. Improved mechanical properties such as modulus and impact strength are also important for these applications. Dimensional accuracy has been a key issue for rapid building of functional parts. Dimensional accuracy is a function of resin shrinkage, draw style patterns, beam diameter compensation, galvanometer calibration, etc. While part accuracy has improved dramatically since the inception of stereolithography, further improvements are possible.

Accordingly, the need exists for an improved method and apparatus which can be used to build parts having anisotropic properties and having upper use temperatures exceeding 100° C.

SUMMARY OF THE INVENTION

That need is met by the present invention which provides an apparatus and process for aligning liquid crystal (LC) monomers and then photopolymerizing to produce parts having glass transition temperatures exceeding those possible with commercially available stereolithography resins, and having optimized mechanical properties. Parts with isotropic, anisotropic, or a combination (as a function of location in the part) of isotropic and anisotropic properties may be produced by varying the layer-to-layer alignment of the LC monomer or by varying the cure temperature (i.e., varying the mesogenic state). Thermosetting liquid crystal monomers contain rod-like mesogenic cores connected by alkane spacers to reactive end-groups. Like crystalline solids, LC materials have some kind of long range molecular order, however, they lack the three-dimensional translational order found in truly crystalline materials.

The simplest type of mesogenic phase is called nematic. In nematic phases, the molecular axis are on average parallel but lack any kind of translational order as indicated in FIG. IA. Smectic phases have both uniaxial molecular orientation and some degree of translational order as indicated in FIG. IB. Many different types of smectic phases have been identified. Some are more fluid in nature (e.g., smectic A) while others are more solid in nature (e.g., smectic D). At the clearing temperature, order disappears and the phase structure becomes isotropic as indicated in FIG. IC. The viscosity of nematics can be considerably lower than those of smectics, on the other hand, smectics have a higher degree of order.

Macroscopic alignment of the LC monomer in a preferred direction can be induced by a variety of means such as by rubbed substrates, magnetic field, electric field, and shear. Photopolymerization, such as by UV laser or visible light laser, of the LC monomer in the aligned state "locks" in the anisotropic structure resulting in materials with anisotropic physical and mechanical properties. Alternatively, a broad band UV light source such as a mercury or xenon lamp or fiber optic light source can be used. A photoinitiator is added in an amount of between about 0.1 and about 4% by weight and preferably between about 0.5% and about 2.0% by weight prior to photopolymerization. Still as a further alternative, a high intensity visible light source, and as a halogen lamp, may be used. In that instance, a visible light photoinitiator would be used. Mechanical strength and stiffness are greater in the molecular alignment direction than in the transverse direction. Also, because the reactive end groups are more tightly packed, cure in an aligned state results in lower shrinkage than is obtained with conventional resins.

Layered objects can be "built" using LC monomers where the layers or regions within the layers are aligned using an external force such as shear, electrical field, or magnetic field forces or combinations thereof. Thus, a magnet may be used to create layers in which the molecular alignment within sections of each layer may be altered by controlling the angle between the magnetic poles and the build axis. In a preferred embodiment, the layers or areas within the layers may be aligned using a magnet on a rotating platform.

Thus, the preferred apparatus of the present invention is a conventional stereolithography apparatus with the addition of a magnet outside the vat in order to align the monomer before cure. The magnet is positioned on a rotatable platform so that alignment can be established at any angle relative to the galvanometer axis. The vat is temperature controlled over a wide range of from about 25° C. to about 150° C. This is desirable so that it is possible to work with all LC phases: smectic, nematic and isotropic. Optionally, the apparatus may contain a molecular alignment measurement device such as an ellipsometry device. Ellipsometry is analogous to birefringence except that reflectance measurements are used instead of transmitted light.

Alternatively, the part can be built with an ink jet deposition apparatus. As in stereolithography a magnet on a movable swivel surrounding the object would be used to align the LC monomer which is deposited by drop-on-demand jets. Layer by layer, a partial layer curing proceeds using a lamp, fiber optic light source, or laser.

As yet another alternative embodiment, the part can be built with a photolithographic apparatus. As in stereolithography a magnet on a movable swivel surrounding the object would be used to align the LC monomer. Layer by layer, partial layer curing, proceeds by exposing the LC monomer to a light source through a photolithographic mask. The photomask can be generated xerographically or by liquid crystal display. Each layer is exposed with a different photomask.

Accordingly, it is an object of the present invention to provide a method for producing ordered objects from initially non-ordered liquid crystal monomers. It is also an object of the present invention to provide parts produced by such a method. It is a further object of the present invention to provide an apparatus for performing, such a process.

These and other objects and advantages of the present invention will become apparent from the detailed description of the preferred embodiments and claims presented below.

BRIEF DESCRIPTION OF THE DRAWINGS

FIG. 14 is a schematic illustration of the apparatus of an alternative embodiment of the present invention.

FIG. 15 is a schematic illustration of the apparatus of another alternative embodiment of the present invention.

DETAILED DESCRIPTION OF THE PREFERRED EMBODIMENTS

Figure 1A:
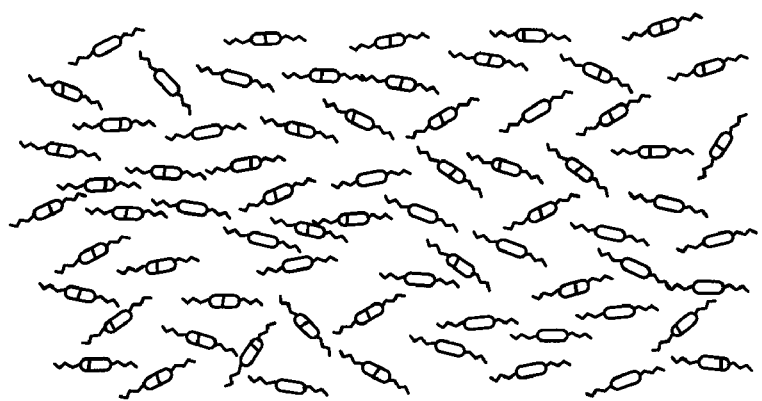
FIG. 1A is a schematic illustration of monomer molecules in a nematic phase.
Figure 1B:
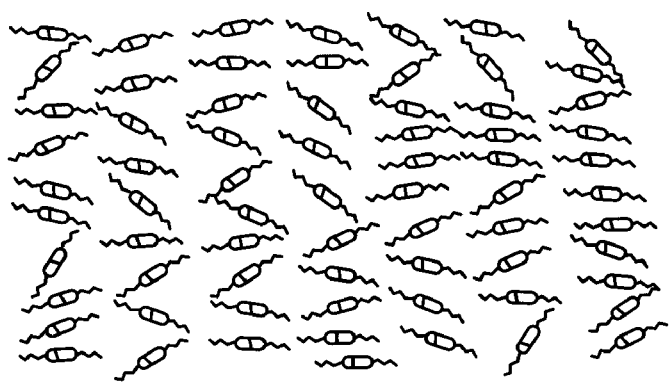
FIG. 1B is a schematic illustration of monomer molecules in a smetic phase.
Figure 1C:
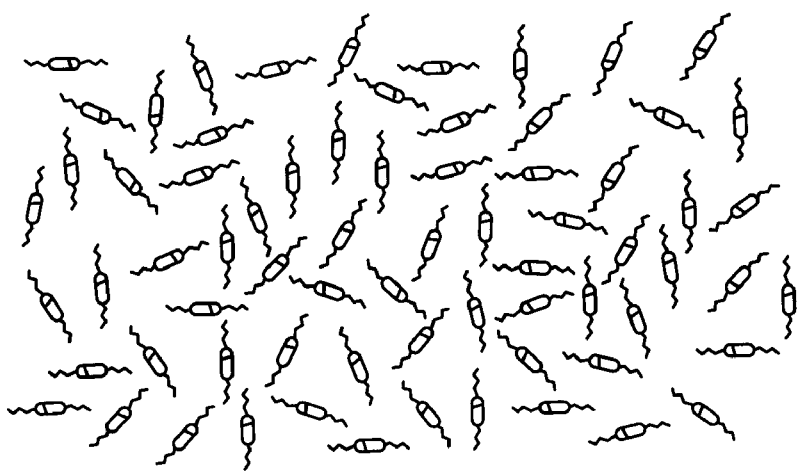
FIG. 1C is a schematic illustration of monomer molecules in an isotropic phase.
Figure 2:
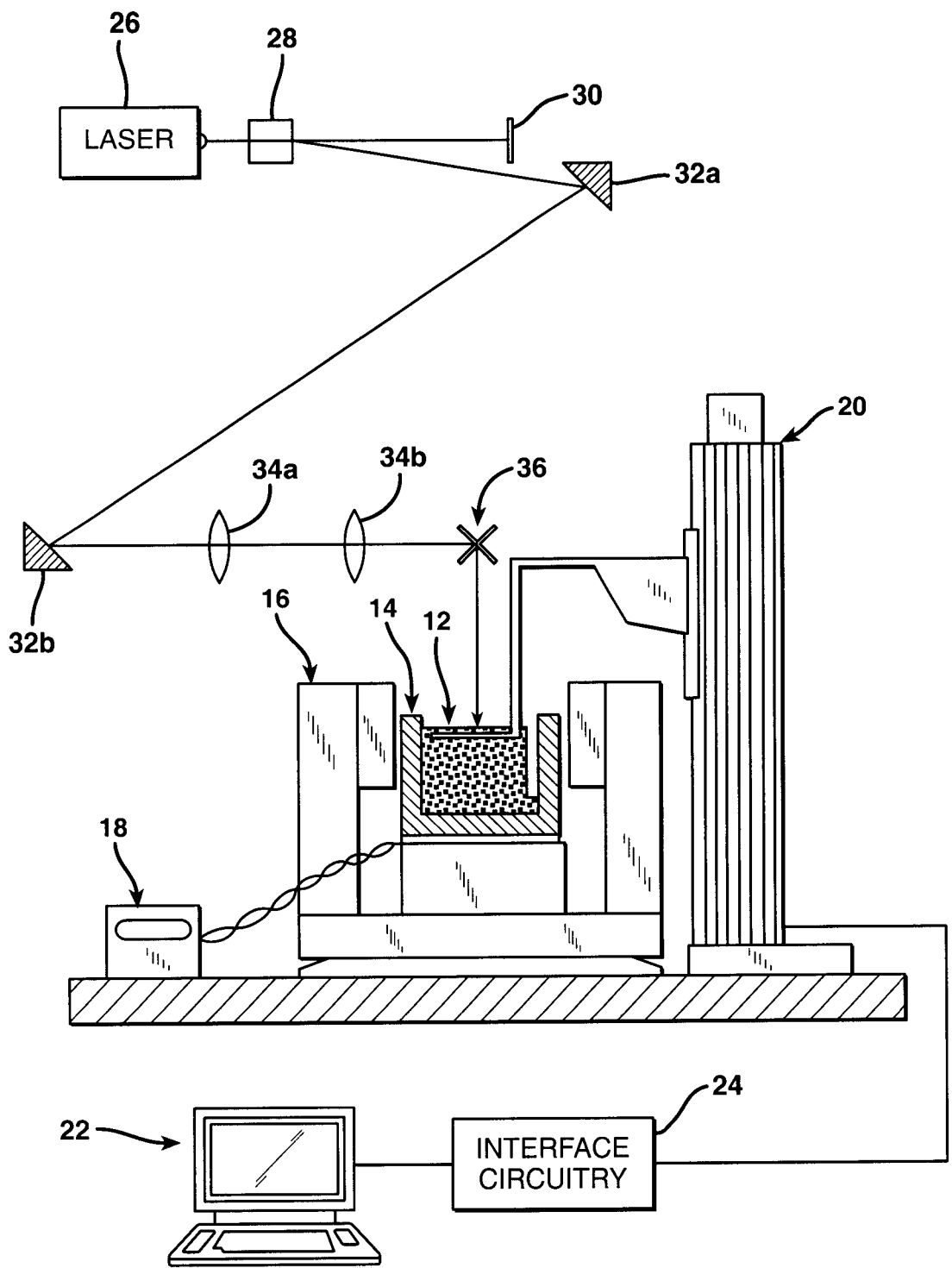
FIG. 2 is a schematic illustration of the preferred apparatus of the present invention.

The stereolithography apparatus 10 for use in performing the process of the present invention is shown in FIG. 2. As shown, elevator stage 20 is used to move building platform 12 to the appropriate level within resin vat 14. Elevator stage 20 is controlled by computer 22 and interface circuitry 24, all as described in M. Pellechia and A. Lightman, "Development of a Table-Top Stereolithography and Its Application to Solid Modeling of Human Tissue," *Proceeding of The Fifth Int. Conf On Rapid Prototyping*, Dayton, Ohio, Jun. 12–15, 1994, pp 99–108. The LC monomer to be photopolymerized is placed in resin vat 14 along with a photoinitiator. A molecular alignment measurement device such as an ellipsometry device may be associated with the vat 14 to provide for in situ measurements. Rotatable magnet 16 is used to align the LC monomer. The rotatable magnet is preferably a permanent magnet having a field strength of 3200 Oersted across a 10 cm gap; although, the permanent magnet field strength can be both higher and lower, and the gap may be greater or less. Alternatively an electric field or a shear field may be used in place of rotatable magnet 16. By using a magnetic or electrical field objects with a high degree of order can be created from initially non-ordered rigid-rod monomers. By using a rotating magnet it is possible to align the LC monomers at any angle relative to the part build axis. It is also possible to produce a part having layers in which the molecular alignment within each layer or sections of each layer can be altered by controlling the angle between the magnetic poles and the build axis. A light source such as laser 26, which may be an argon UV laser or a HeCd laser, is used to activate the photoinitiator and polymerize the LC monomer. Alternatively, a mercury or xenon lamp may be used as the light source.

Preferred is a UV laser scanning system having not only laser 26, but also focusing optics such as reflectors 32a and 32b and lenses 34a and 34b, as shown, an acusto-optic modulator/shutter 28, stop 30, x-y galvanometer scanners 36, and a system to calibrate laser beam pointing, again all as shown in the Pellechia and Lightman article mentioned above. The apparatus of the present invention also has a heater controller 18 so that the monomer may be processed at elevated temperatures. Heater controller 18 allows objects to be formed at different temperatures, which may range from about 25° C. to about 150° C. for example.

As an alternative ink jet deposition apparatus 40 as shown in FIG. 14 may be used. As shown, build table 42 holds a build substrate 44 having an object model 46, supported by overhang support 48. Drop-on-demand jets (ink jets) 50 deposit an LC monomer on the object model 46. Rotatable magnet 52 is used to align the LC monomer. A light source 54, which may be a lamp, fiber optic light source, or laser, is used to activate the photoinitiator and polymerize the LC monomer.

As yet another alternative embodiment, photolithography apparatus 60 as shown in FIG. 15 may be used. An elevator stage as in FIG. 2 (not shown) is used to move building platform 62 to the appropriate level within resin vat 64. The LC monomer to be photopolymerized is placed in resin vat 64 along with a visible light photoinitiator. Rotatable magnet 66 is used to align the LC monomer. A light source 68, which may be a UV lamp, is shone through photolithographic mask 70, to activate the photoinitiator and selectively polymerize the LC monomer. The photolithographic mask 70 can be generated xerographically or by liquid crystal display. Each layer is exposed with a different photomask.

In each of the embodiments, the LC monomer may be any of those disclosed in copending application Ser. No. 60/077, 467, filed on Mar. 10, 1998 the disclosure of which has been incorporated by reference.

Objects made by the method of the present invention can be used for any application but particularly for direct fabrication of polymeric injection molds, parts for under-hood automotive applications, objects to be used for wind tunnel tests, and medical models or surgical/prosthetic devices that must be autoclave sterilized prior to use. That is because it is possible with the present method to create ordered objects that have upper use temperatures exceeding 100° C. and as high as 200° C. or greater.

EXAMPLE 1

Two liquid crystal monomers having the structure shown below were used in this example:

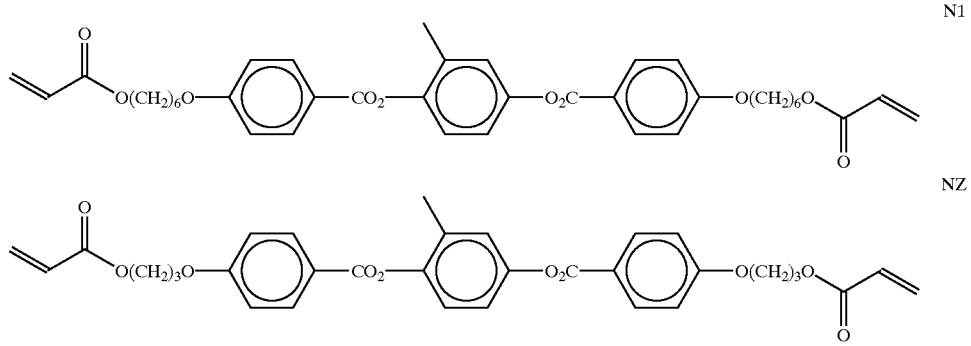

The monomers differ only in the length of the alkyl spacer groups. Monomer N1 has a spacer length of six-$CH_2$— groups while monomer N2 has a spacer length of three. Both monomers exhibit broad nematic phases above room temperature. Broer and co-workers first reported on these monomers. See D. J. Broer, G. N. Mol, G. Challa, "In situ photopolymerization of an oriented liquid-crystalline acrylate, 5, Influence of the alkylene spacer on the properties of the mesogenic monomers and the formation and properties of oriented polymer networks, "Makromol. Chem., 192, (1991) 59–74; D. J. Broer, G. N. Mol, G. Challa "Temperature effects on the kinetics of photoinitiated polymerization of diacrylates," Polymer, 32, (1991) 690–695; D. J. Broer, J. Boven, G. N. Mol, G. Challa, "In situ photopolymerization of an oriented liquid-crystalline acrylate, 3, Oriented polymer networks from a mesogenic diacrylate," Makromol. Chem., 190 (1989) 2255–2268; and D. J. Broer, R. A. M. Hikmet, G. Challa, "In situ photopolymerization of an oriented liquid-crystalline acrylate, 4, Influence of a lateral methyl substituent on monomer and oriented polymer network properties of a mesogenic diacrylate," Makromol, Chem., 190, (1989) 3201–3215. The photo-initiators used were obtained from Ciba-Geigy. Methylene-chloride was used for mixing the photo-initiators with the monomers and was used as-received from Fisher Scientific (99.9% pure).

Dielectric permittivity of the monomers was measured as a function of temperature and time in the presence of a magnetic field to estimate the molecular order parameter and re-orientation time constants. Samples consisted of approximately 250 mg of monomer sandwiched between two parallel gold electrodes that were 0.3 mm apart. A permanent magnet having a field strength of 3200 Oersted across a 10 cm gap was used to orient the monomers in their nematic state suing the apparatus of the present invention as described above. The permittivity was measured with a Hewlett Packard 4192A impedance analyzer using an excitation potential of 1 Volt. In the frequency range of this instrument (5 Hz to 13 MHz), there was no detectable dipole relaxation so both the permittivity and loss factor curves were relatively flat. The data were taken at 100 KHz.

Parts were also built using the apparatus of the present invention, again with the magnet having an adjustable gap with the field strength of 3200 Oersted over a gap of 10 cm. The mini-vat used was made of aluminum and was temperature controlled. An Argon-ion laser from Coherent was used to build parts. A broad-spectrum UV flood lamp was used for postcure.

Widely spaced strands were drawn such that there was no overlap of adjacent strands. A typical center-to-center spacing used was 1.02 mm (40 mils). The dimensions of the part were approximately 3 cm×1 cm. Cure depths were measured using Mitutoyo digital micrometer. Measurements were made away from the borders and the diagonal corner-to-corner strands. Thus, the average cure depth of single strands was measured. Energy density was calculated by the following expression:

$$E_{max}=(2\pi)^{1/2}P_V/(w_0\ v_d)[mJ/cm^2] \qquad \text{Eq. 1}$$

where $E_{max}$ is the maximum energy at the vat,
$P_V$ is the laser power at the vat, mW,
$w_0$ is the beam radius at 1/e its intensity, and
$v_d$ is the draw speed, cm/s.

The draw speed, $V_d$, can be varied as can the power, $P_v$. The beam radius $w_0$ is a function of the system optics and was constant for all experiments. Working curve parameters can be calculated by using the equation below:

$$C_d=D_p ln/E_{max}/E_c [mils] \qquad \text{Eq. 2}$$

where: $C_d$ is the measured cure depth of a strand,
$D_p$ is the penetration depth at which the beam intensity is reduced to 1/e of its surface value,
$E_{max}$ is the maximum energy at the monomer surface,
$E_c$ is the critical energy required for gelation.

Double-pass parts were made by using the same geometry as the single pass part and adding an orthogonal set of strands. The cure depth measured in this case represented the juncture of two strands. Effective laser scan rates used for working curve parts ranged from 2.0 to 58 cm/s.

Dynamic mechanical measurements were made using Rheometrics RSAII dynamic mechanical analyzer. The measurements were made in tensile oscillation at a frequency of 1 Hz, and with a strain amplitude of approximately 0.05%. All samples were heated to 150° C. and cooled quickly before testing to eliminate physical aging effects.

Dielectric analysis was used to analyze 1) order in aligned monomers as a function of temperature, and 2) the re-orientation dynamics of the monomers as a function of temperature when the poles of the aligning magnet were rotated 90 degrees.

Figure 3A:
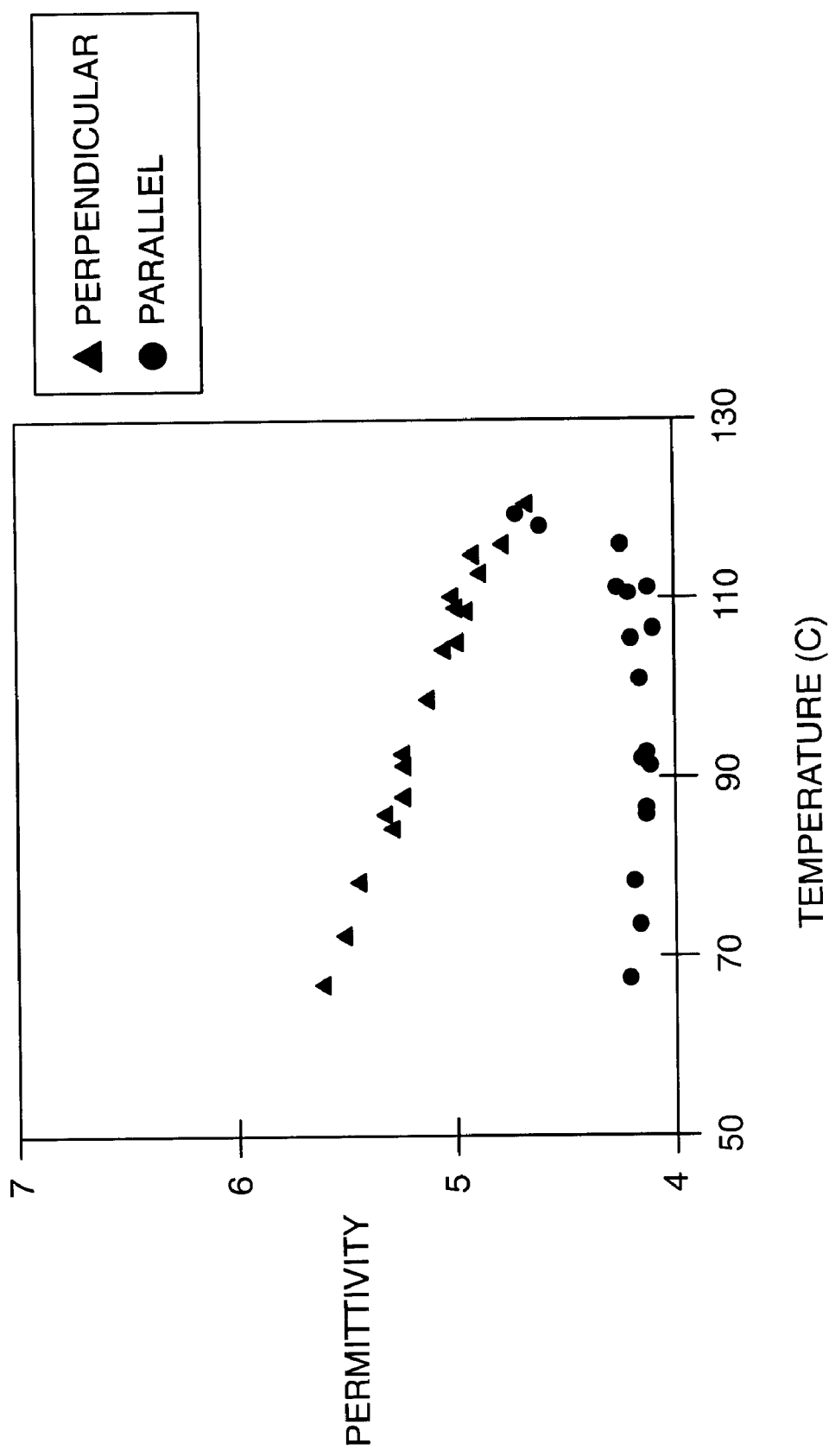
FIG. 3A is a graph of dielectric permittivity plotted as a function of temperature for monomer N1.
Figure 3B:
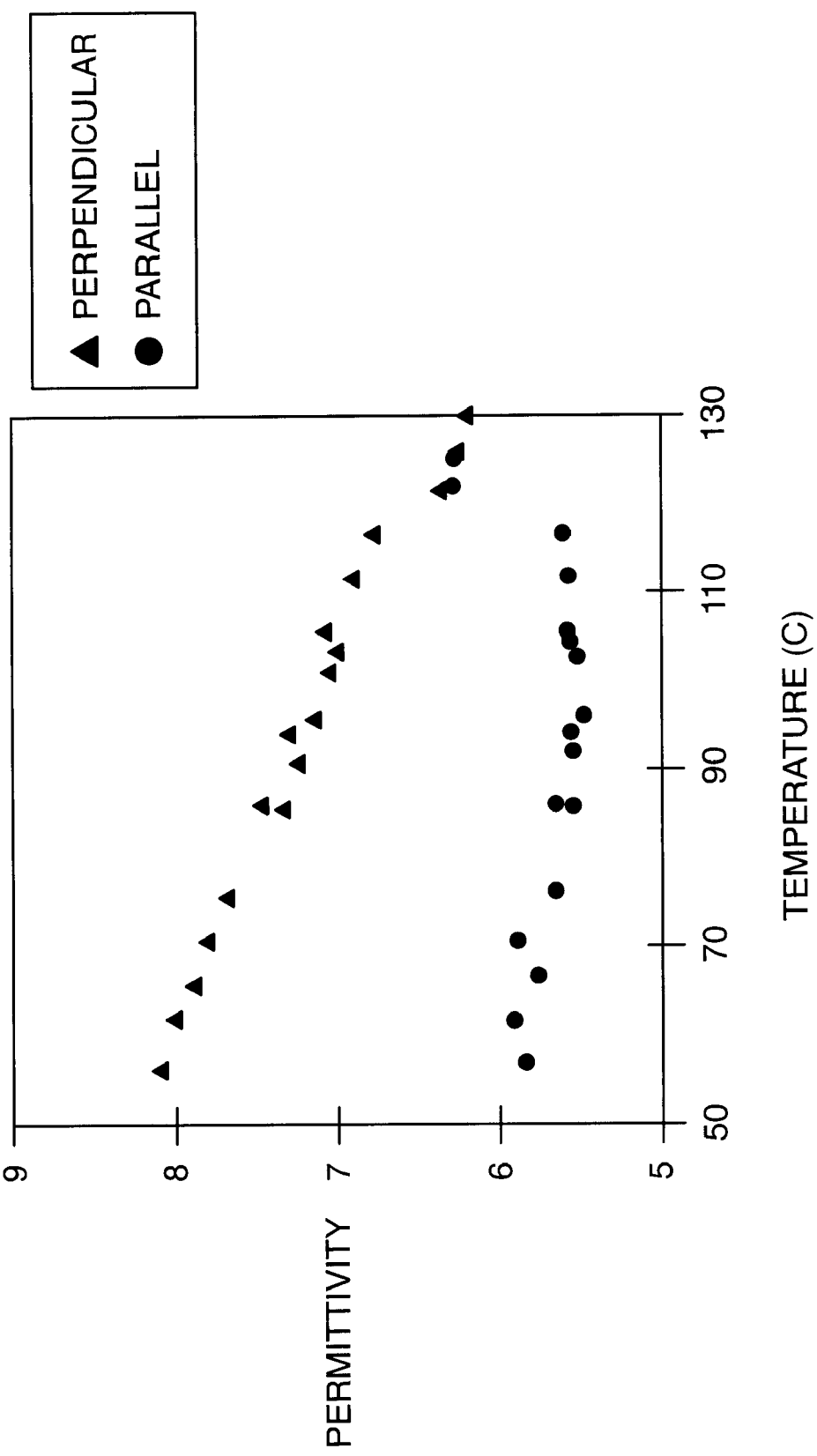
FIG. 3B is a graph of dielectric permittivity plotted as a function of temperature for monomer N2.

Though the order of a liquid crystal cannot be directly measured, it can be estimated based on the anisotropy of a macroscopic material property—dielectric permittivity being one such property. Permittivities were measured with two magnetic field arrangements: with the magnetic field parallel to the electric field of the impedance analyzer, $\in'\|$, and with a magnetic field orthogonal to the electric field of the impedance analyzer, $\in'\perp$. FIG. 3A shows the results for monomers N1 and FIG. 3B shows the results for monomer N2, both over a wide temperature range. In the nematic state, as the nematic-to-isotropic transition temperature ($T_{n \to i}$) is approached, the anisotropy in the permittivity decreases indicating a more random order. Above $T_{n \to i}$, the anisotropy in the permittivity disappears and the dielectric permittivity is single-valued. Thus, the difference in dielectric the permittivity (measured at 0° and 90° relative to the imposed magnetic filed) can be used to determine the amount of order.

Figure 4A:
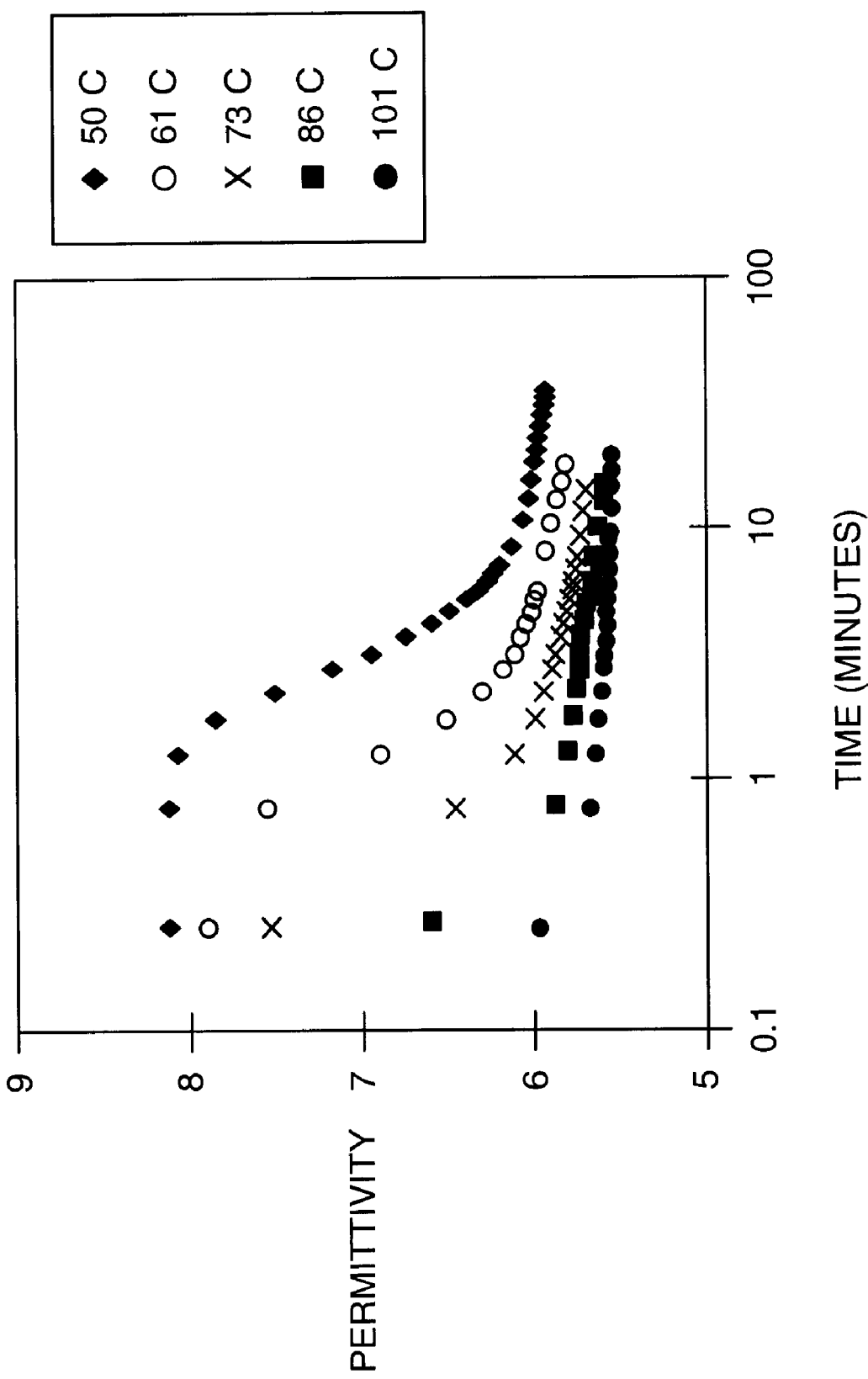
FIG. 4A is a graph of dielectric permittivity measured as a function of time for the N2 resin after changing the magnetic field from parallel to perpendicular.
Figure 4B:
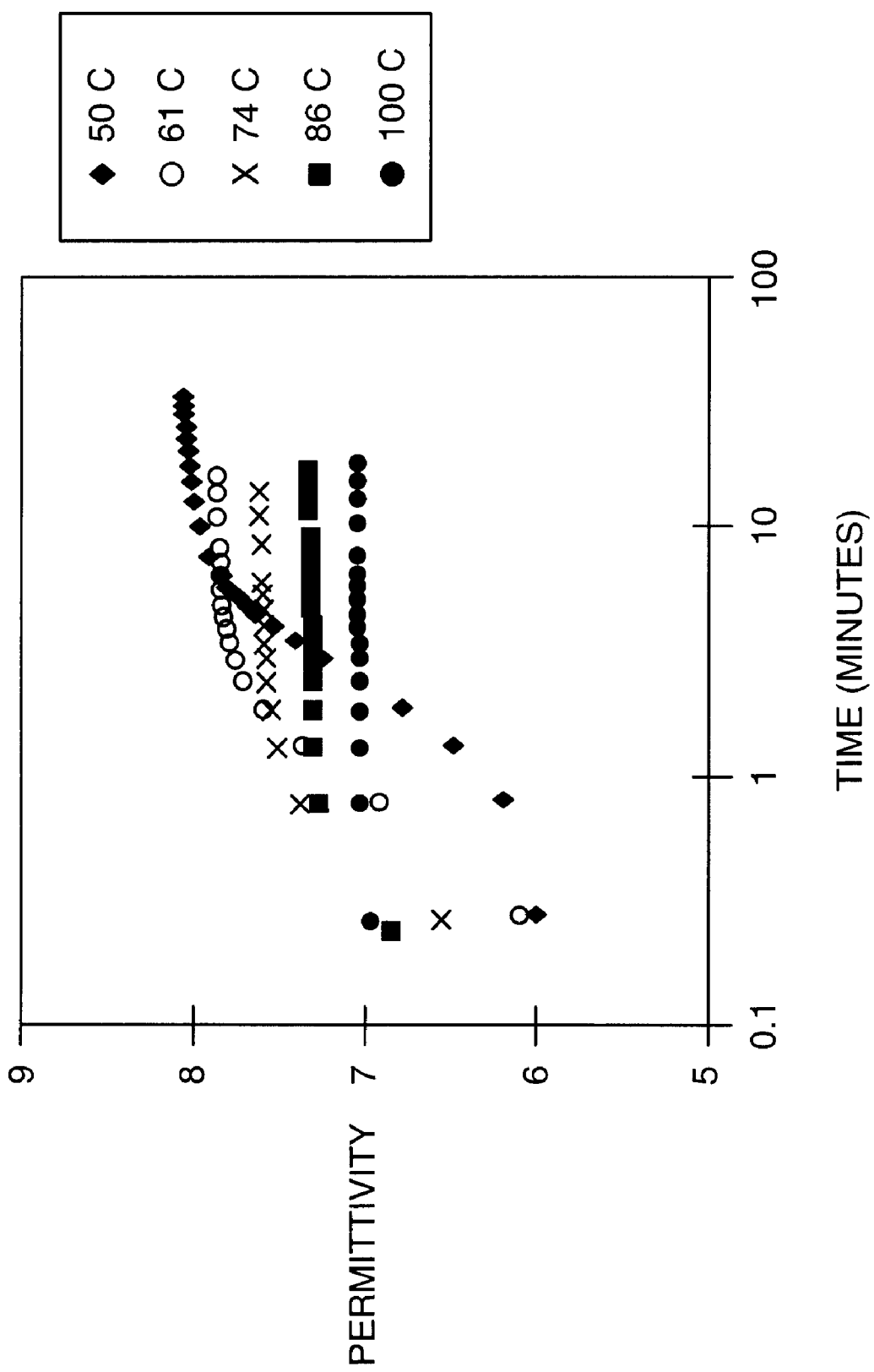
FIG. 4B is a graph of the dielectric permittivity measured as a function of time for the N2 resin after changing the magnetic field from perpendicular to parallel.

The value of the permittivity can also be used to follow changes in orientation of the mesogens. In determining how long it would take to change molecular alignment because of the potential need for doing this during the stereolithography build process, a magnetic field was used to align the monomer initially in one direction and then the field was rotated 90° and the permittivities monitored over time. FIG. 4 shows the results for experiments conducted at various temperatures. The time to re-orient is very much temperature dependent. At temperatures above about 85° C. the re-orientation was accomplished in less than one minute. At lower temperatures it took several minutes for re-orientation to occur. The time required to re-align the monomer can be reduced by applying a shearing force along with the magnetic field.

Factors that affect polymerization kinetics affect the values of the working curve parameters for the liquid crystal monomers studied. A simple experiment was devised to measure laser UV light transmission through the nematic monomer before, during and after laser exposure. It was determined from this that the formed polymer more strongly absorbs the UV light than the monomer in the nematic state. Thus, photo-initiator type and content were found to strongly affect the working curve parameters. Processing conditions such as time and temperature also affected the working curve parameters. At temperatures approaching the nematic to isotropic transition (within 20° C.) re-orientation of the molecules occurs quickly-less than one minute, making the process suitable for rapid prototyping.

Figure 5:
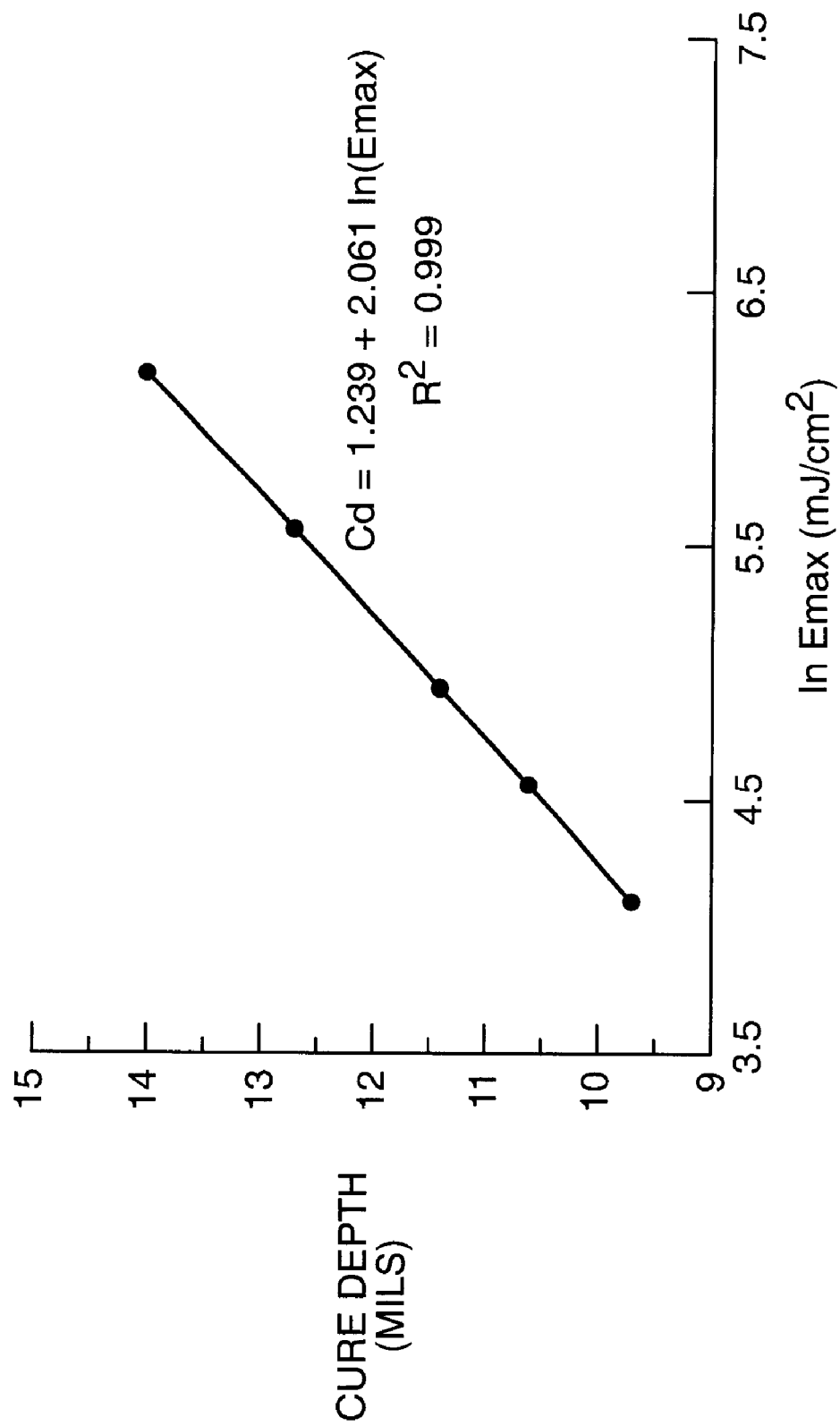
FIG. 5 is a graph of a working curve for the N2 resin in the nematic state at 100° C. with an Argon ion laser.

An initial concentration of IngaCure 369, a photoinitiator available from Ciba-Geigy, by weight of 2% was used in the resins N1 and N2. Working curve parameters for these formulations were lower in value than typical commercial stereolithography resins. For example the parameters for the N2 resin cured in the nematic state at 100° C. were: $D_p$=2.06 mil and $E_c$=0.55 mJ/cM$^2$. The Argon ion laser was operating at 364 nm and the power at the vat was measured to be 14 mW. FIG. 5 shows the working curve for these parameters.

Figure 6:
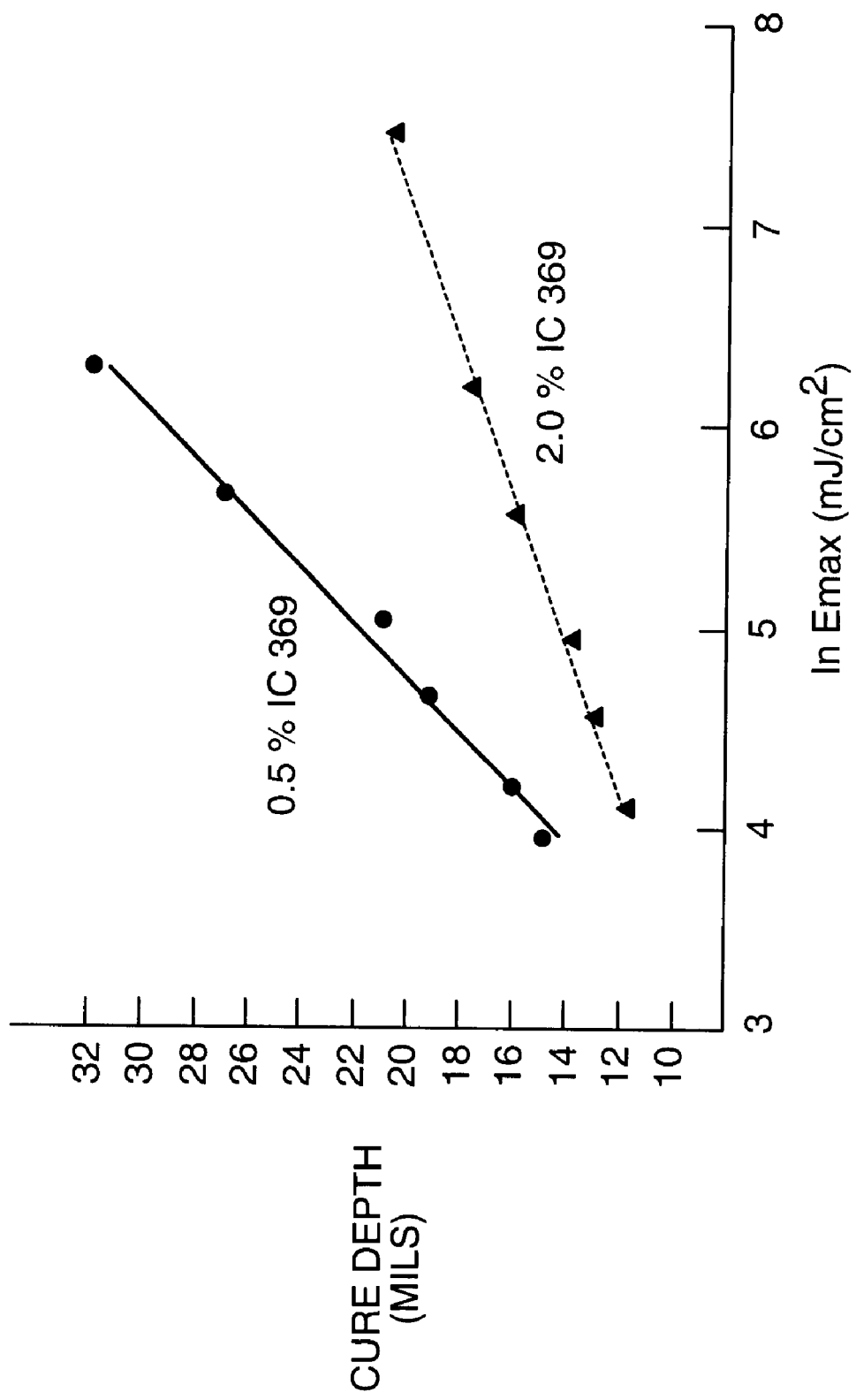
FIG. 6 is a graph of comparison working curves for the N1 resin containing different amounts of photoinitiator.

The N1 resin was studied more extensively in this example. With 2% IC 369 the $D_p$ parameter ranged from 1.2 to 2.7 mils depending on the processing conditions. For example, decreasing the temperature from 100° C. to 85° C. resulted in an increase in the penetration depth from 1.2 to 2.7 mils and an increase in the critical energy from 0.001 to 0.7 mJ/cm$^2$. The rate of polymerization is higher at 100° C. than at 85° C. When the concentration on the photoinitiator was decreased from 2% to 0.5%, the working curve parameters were affected significantly as shown in FIG. 6. Under the same processing conditions (85° C. and 14 mW power at the vat), the lower concentration (0.5% IC 369) resulted in a $D_p$=7.3 mil and $E_c$=7.4 mJ/cm$^2$.

TABLE 1

Dimensions for N1 strands drawn with magnet in place.

| Cure depth (mils) - at strand intersections | Cure width (mils) - strands parallel to magnetic field | Cure width (mils) - strands perpendicular to magnetic field |
|---|---|---|
| 26.6 | 10.0 | 16.5 |
| 23.7 | 7.8 | 12.8 |
| 20.3 | 7.4 | 11.7 |
| 16.9 | 6.2 | 11.3 |
| 11.8 | 6.0 | 10.4 |
| 10.9 | 5.1 | 7.8 |

In the nematic state it was found that magnetic field alignment affected both the strand cure depth and width significantly. Table 1 compares strand widths for strands drawn parallel to and perpendicular to the magnetic field. The cure depths reported in the Table represent the juncture of a parallel and a perpendicular strand. Strand widths for strands drawn perpendicular with the magnetic field were on average 66% larger than strands drawn parallel with the magnetic field. When the resin was cured in the isotropic state there was no difference in strand dimensions for strands drawn in one direction versus another. In the aligned nematic state light scattering occurs anisotropically and is more pronounced in the direction of molecular alignment.

Figure 7:
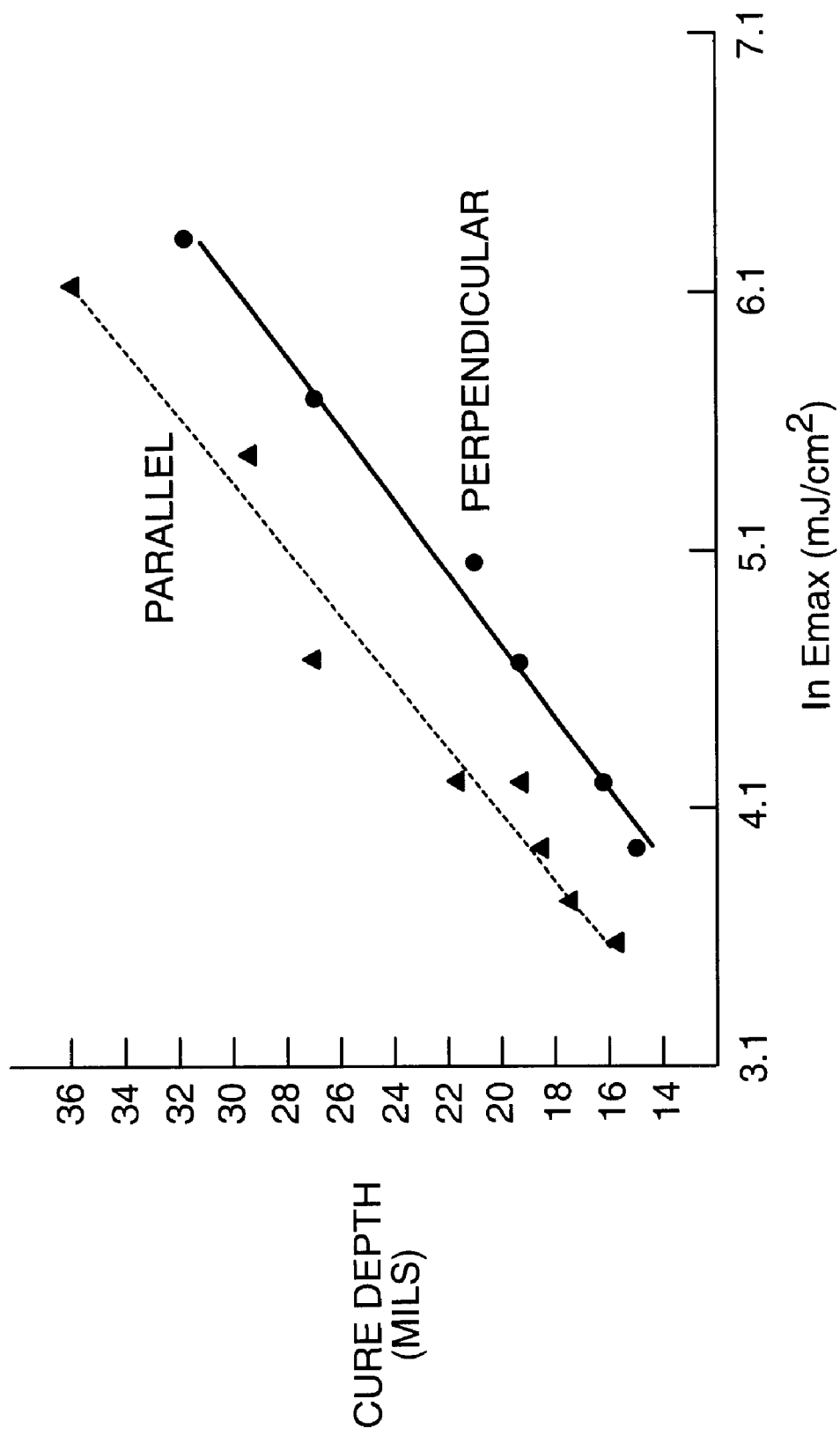
FIG. 7 is a graph of comparison working curves for the N2 resin for strands drawn parallel to the magnetic field and strands drawn perpendicular to the magnetic field.

As might be expected based on the above finding, cure depths were greater for strands drawn parallel to the magnetic field compared with the strands drawn perpendicular to the field using equivalent energy densities. FIG. 7 compares working curves for these two cases. The measured penetration depth decreased slightly (8%) going from the parallel to the perpendicular case. However, the corresponding change in critical energy was large, an increase of 51%. This change is consistent with the notion that greater light scattering occurs along the molecular alignment direction.

Working curves for "double pass" parts have also been generated. These parts consist of orthogonal vectors spaced 20 to 40 mils apart such that there is no overlap of adjacent vectors. Working curves for these parts indicate an increase in the critical energy and a decrease in the penetration depth compared with the parameters for single-pass parts made under the same conditions. These differences are expected because the cured resin absorbs the laser light more highly than the uncured resin.

DMA was used to measure the glass transition temperatures ($T_g$) of green and postcured specimens built in the apparatus shown in FIG. 2 using an Argon ion laser delivering 33 mW of UV power to the vat. An external magnet was used to induce unidirectional orientation in the monomer. Green $T_g$'s for the N1 resin varied from 51 to 61° C. depending on the cure temperature. The measured $T_g$'s for postcured N1 specimens ranged from 75° C. to 94° C. Green $T_g$'s for the N2 resin ranged from 57 to 82° C. while the $T_g$'s of postcured specimens ranged from 112 to 145° C. Note that the $T_g$ is taken to be the peak in the loss modulus. Peak tan delta values are generally 20 to 30 ° C. higher than $T_g$ values measured by the loss modulus.

Figure 8:
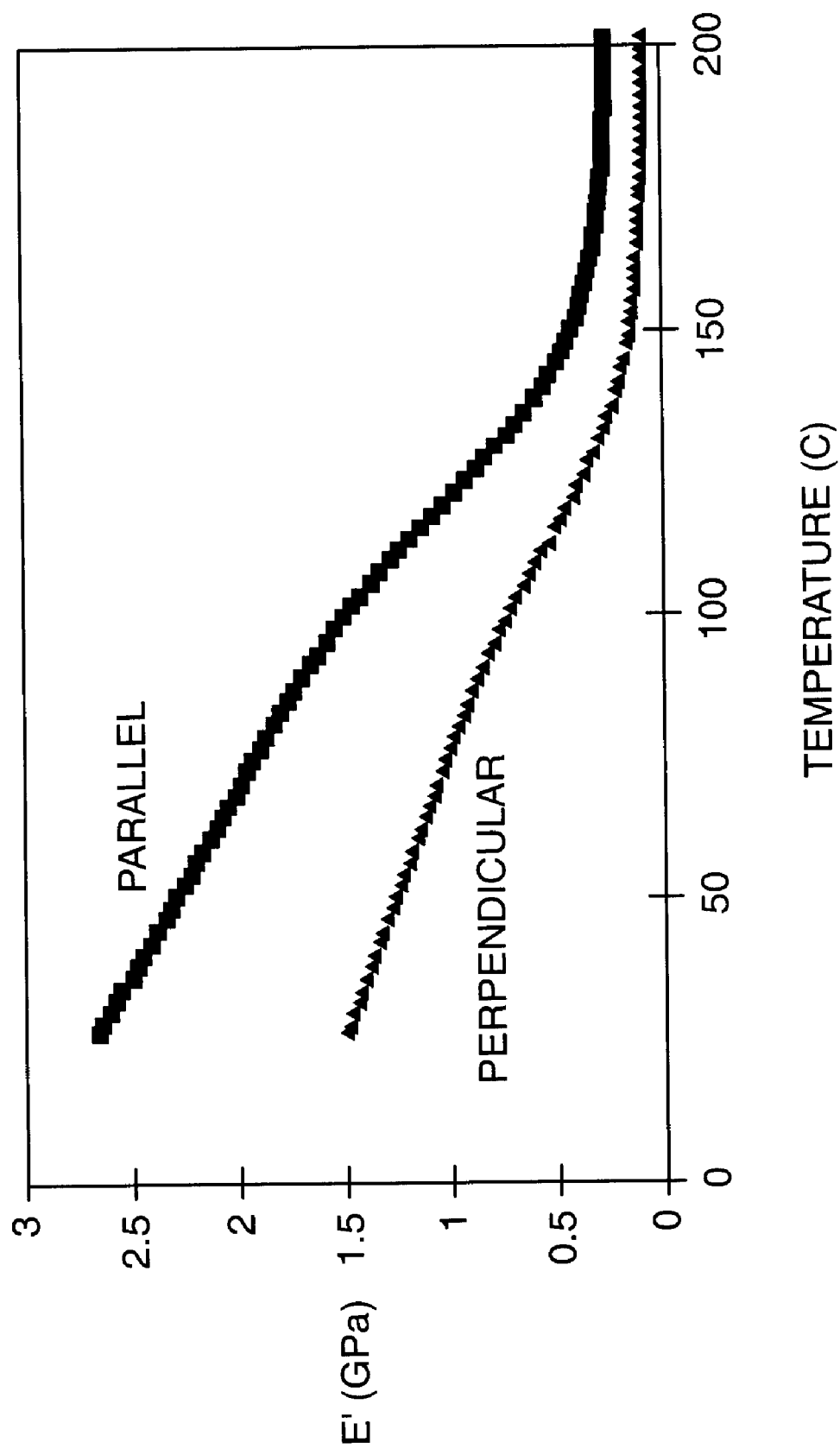
FIG. 8 is a graph of a comparison of the dynamic elastic moduli for N2 specimens.

FIG. 8 shows the results of DMA analysis of two aligned samples of the N2 resin after postcure. For one sample the test direction was parallel to the molecular alignment direction, and for the other the test direction was perpendicular to the molecular alignment direction. The mechanical anisotropy is almost a factor of 2. At room temperature, the modulus in the alignment direction was measured to be 2.8 GPa at 1 Hz. The modulus measured in the transverse direction was 1.6 GPa.

EXAMPLE 2

Multi-layer specimens were made with the stereolithography apparatus shown in FIG. 2 using an Argon ion laser tuned to 364 nm. Two resins were used. The N1 resin was used for most of the specimens and was catalyzed with 0.5% IrgaCure 369 photo-initiator from Ciba. The N2 resin was also used with 0.5% IngaCure 369. The N1 resin temperature was controlled at 85° C. during part build. The N2 resin temperature was controlled at 100° C. These temperatures are within the pneumatic range for both resins.

The magnet used for alignment was mounted on a turntable so its position relative to the build platform could be manually adjusted. A T-square was used to adjust the magnet poles to be either parallel or perpendicular to the build platform. A four minute wait period was allowed between the time the magnet was positioned and the next layer was drawn. All parts were made using an alternating draw style with a center-to-center spacing of 6 mils (0.152 mm). The layer thickness used was either 10 mils (0.254 mm) or 8 mils (0.203) depending on the part. All parts made for the thermal expansion studies were rectangular in shape with the short side measuring about 10 mm and the long side measuring about 25 mm.

When the magnetic field was aligned parallel to the long direction of the part the orientation was labeled 0 degrees. Likewise, when the magnetic field was aligned perpendicular to the long direction of the part, the orientation was labeled 90 degrees. Thick parts made for this study are given in Table 2.

TABLE 2

List of Thick Parts

| Material | Part Orientation | # of Layers | Layer Thickness |
|---|---|---|---|
| N1 | 0 degrees | 16 | 10 mil |
| N1 | 0/90 symmetric | 13 | 8 mil |
| N1 | 0/0/90 symmetric | 12 | 8 mil |
| N2 | 0 degrees | 12 | 10 mil |

The symmetric nomenclature in composite mechanics means that the ply orientation lay-up is symmetric about the mid-plane of the part. For the two parts made with 0 and 90 layers, the build order is shown in Table 3.

TABLE 3

Layer Orientations for 0/90 Parts

| Part | Layer # | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| 0/90 | 0 | 90 | 0 | 90 | 0 | 90 | 0 | 90 | 0 | 90 | 0 | 90 | 0 |
| 0/0/90 | 0 | 0 | 90 | 0 | 0 | 90 | 90 | 0 | 0 | 90 | 0 | 0 | |

After building a part, it was removed from the platform. Any support structures attached to the part were removed before post-cure. The parts, heated to 150° C. were post-cured using a broad-band Mercury vapor lamp. The parts were post-cured bottom-side up for two hours; and then top-side up for two hours. Thermal expansion measurements were done using a TA Instruments model 2940 TMA using a scan rate of 5° C./min.

Figure 9:
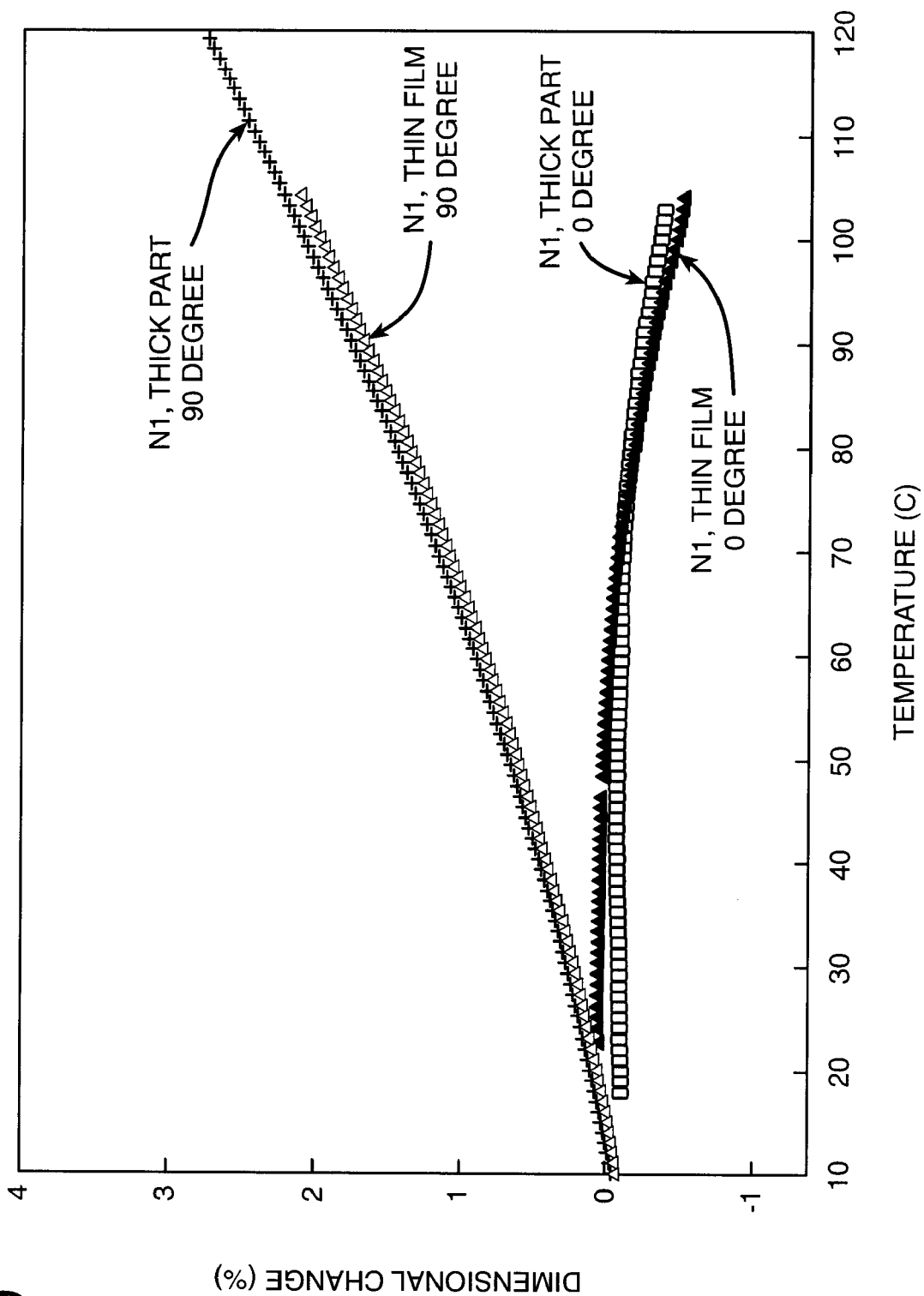
FIG. 9 is a graph of linear thermal expansion data for N1 thin films and thick parts.

First we compared the thermal expansion properties of thick parts manufactured via stereolithography with those of thin films made under ideal conditions. FIG. 9 shows the thermal expansion of the 16 layer unidirectional N1 part compared with the thermal expansion of N1 films. Table 4 lists linear thermal expansion values above and below the glass transition temperature for these specimens. The transverse, or 90 degree, data matched with no significant difference for the 90 degree film and part. There was a greater difference between the 0 degree film and part. The differences may be due to procedural error in aligning the magnet poles before scanning the film or part, or errors in mounting the film for thermal expansion measurement.

TABLE 4

Thermal Expansion Values for N1 Films and Parts

| N1 Specimen | α, from 25 to 40° | α, from 85 to 100° C. |
|---|---|---|
| Film, 0 degree | −17.6 ppm/° C. | −139 ppm/° C. |
| Part, 0 degree | 7.9 ppm/° C. | −102 ppm/° C. |
| Film, 90 degree | 179 ppm/° C. | 315 ppm/° C. |
| Part, 90 degree | 180 ppm/° C. | 328 ppm/° C. |

Another possibility is that the differences in the slopes of the expansion curves indicate that the multi-layer part is not as perfectly aligned as the thin film. There are several possible sources of disorder inherent with the laser scanning process. Thus it is likely that both scan speed (energy density) and scan pattern will effect thermal gradients and flow; and that both may affect the degree of alignment achievable in parts made from LC monomers.

Figure 10:
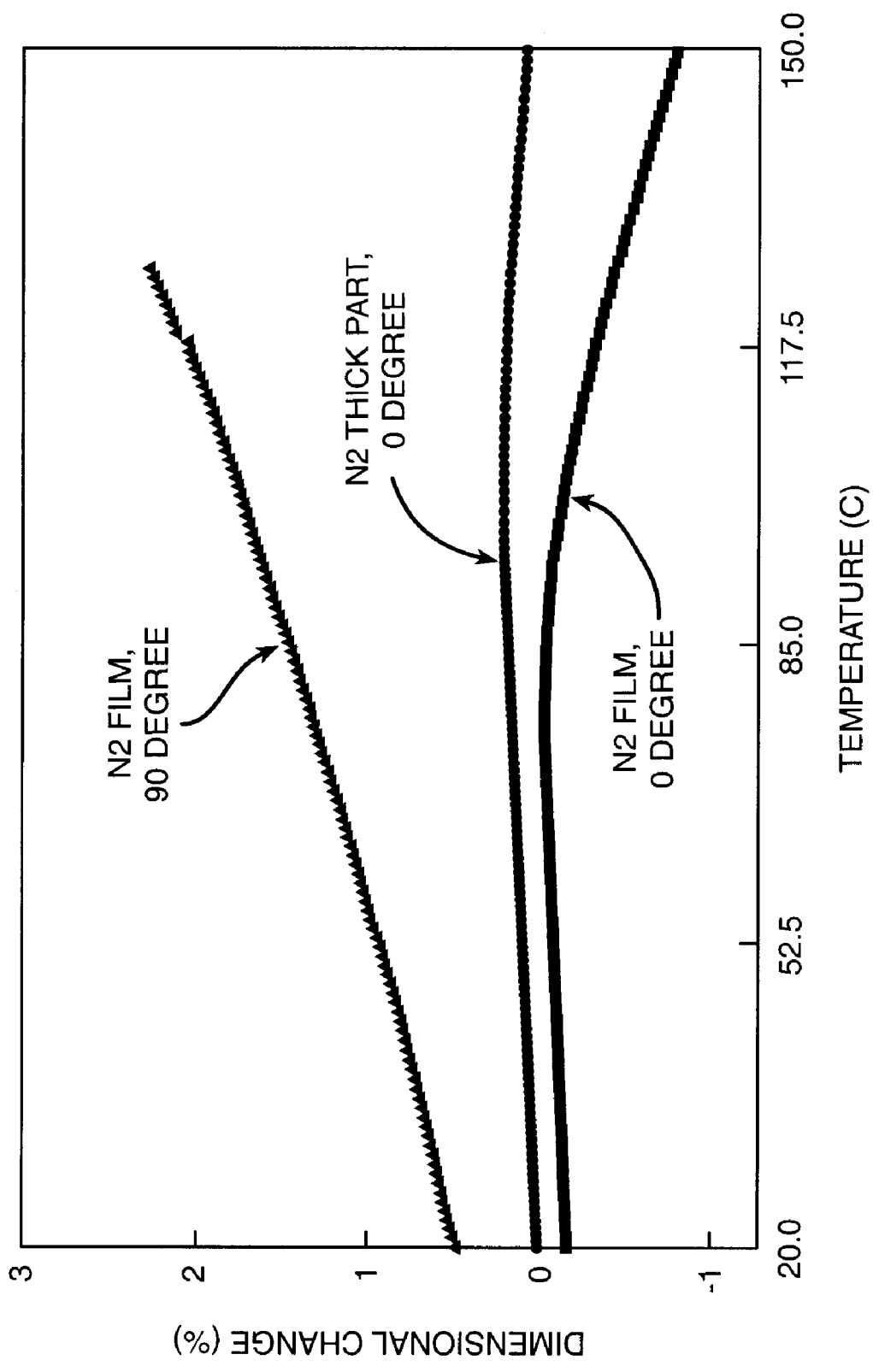
FIG. 10 is a graph of linear thermal expansion data for N2 thin films and thick parts.

FIG. 10 shows thermal expansion data for the N2 monomer. Below the glass transition temperature, the 0 degree data for the film and part are nearly parallel. Above the glass transition, however, there appears to be a greater difference. The thick part has a much flatter thermal expansion curve compared to the negative slope, or shrinkage, of the thin film. For example, in the temperature range of 115° C. to 145° C. the thermal expansion of the film was −143 ppm/° C. for the part.

The N1 data in FIG. 9 indicate that thick parts can be made with a significant degree of alignment resulting in anisotropic thermal expansion properties. A similar anisotropy in thermal expansion properties is characteristic of continuous fiber-reinforced composite plies. In-plane thermal expansion is minimized in composite laminates by arranging the plies at different angles. This technique was evaluated with the aligned N1 resin. A 13 layer part was made have layers aligned alternating between 0 degrees (angle between magnetic and long side of part) and 90 degrees as shown in Table 3. The first attempt at building this part failed due to delamination at one corner of the part. The 0/90 configuration results in large normal forces at the edges of a part. In the N1 part the normal forces were large enough to cause delamination after about 6 layers were built.

Figure 11:
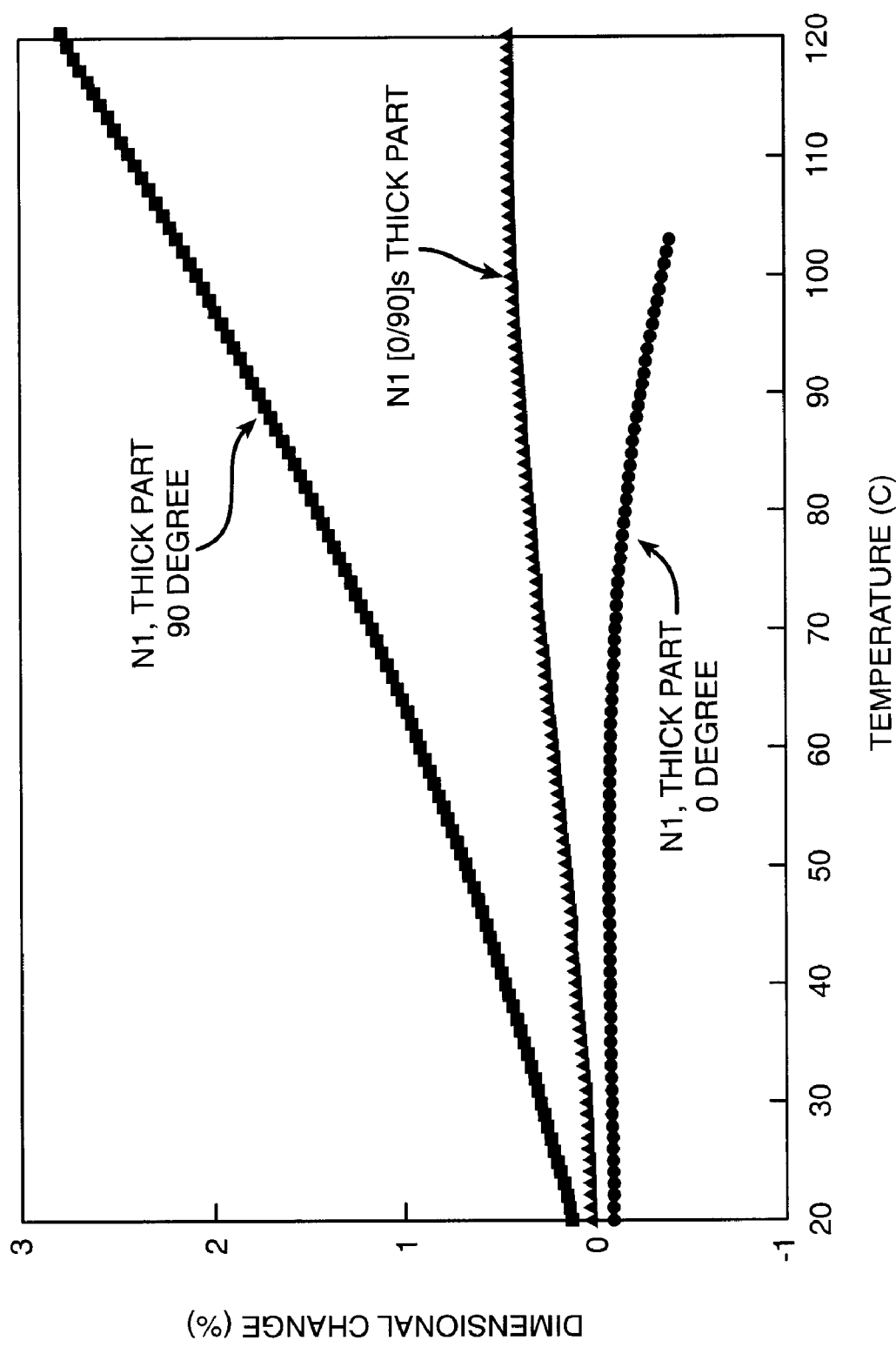
FIG. 11 is a graph of N1 thermal expansion data for a 0/90 symmetric part and a uni-directionally aligned part.

To compensate for the normal forces, the layer thickness was decreased from 10 mil to 8 mil keeping the scan speed the same. The result of this change was to generate deeper overcure into the last-built layer. After the part was made, it was removed from the supports and examined. A small (2–3 nmu) length of delamination was evident at one corner. This section was cut off using a diamond saw after the part was post-cured. The thermal expansion in the long direction was then measured and compared with the thermal expansion of the uni-directionally aligned 16 layer part as shown in FIG. 11. As expected, the thermal expansion of the 0/90 part falls somewhere in between the expansion curves for the 0 degree and the 90 degree part. It will be shown later that composite mechanics can be used to predict the thermal expansion properties of multi-angle aligned parts.

Figure 12:
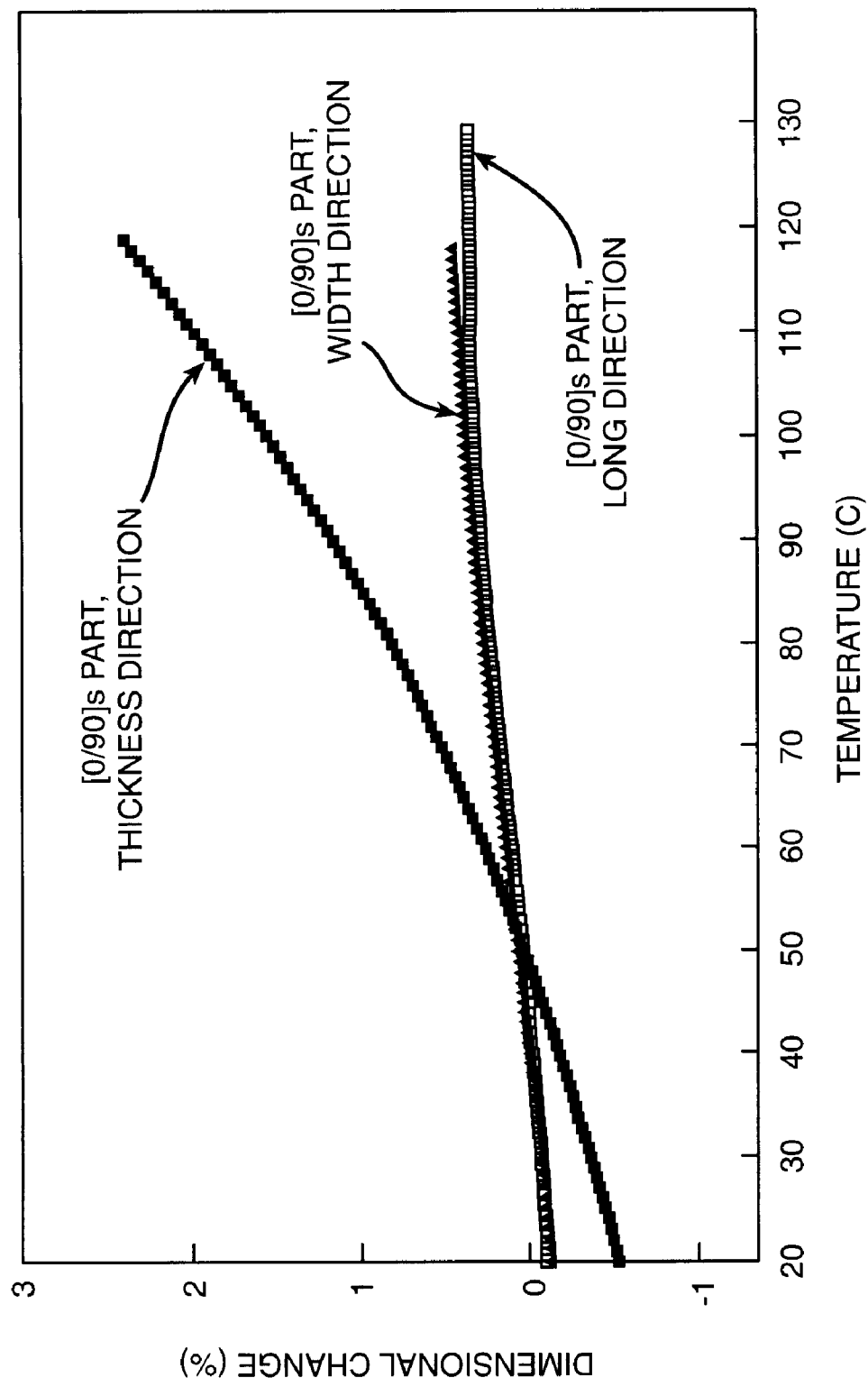
FIG. 12 is a graph of N1 linear thermal expansion as a function of part orientation for 0/90 parts.

Based on the 0/90 symmetric part design, the thermal expansion of the part should be the same measured in the 0 degree direction (length) as it is measured in the 90 degree (width) direction. The thermal expansion properties in the 0 degree, 90 degree, and thickness direction were analyzed and are shown in FIG. 12. The curves for the two in-plane directions are nearly the same showing good dimensional stability over the temperature range evaluated. The out-of-plane (part thickness) direct, however, exhibits a large positive thermal expansion coefficient of about 184 ppm/° C. below the glass transition temperature.

Figure 13:
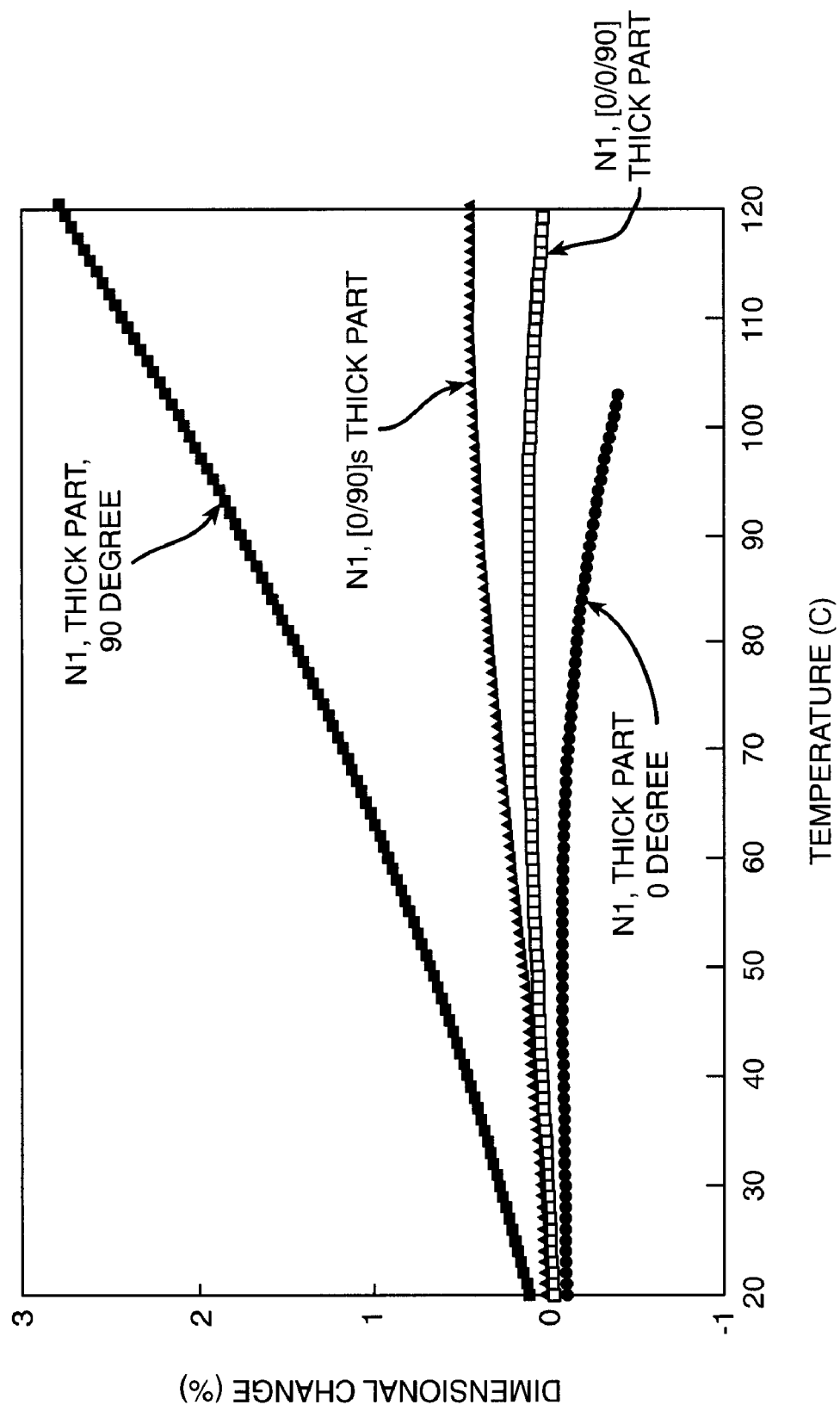
FIG. 13 is a graph of the thermal expansion properties of N1 thick parts.

A second multi-angle part was made using a 0/0/90 symmetric type sequence. As shown in Table 3, a total of 12 layers were built. The 0/0/90 build sequence did not result in any delamination of the part. The thermal expansion of the part was evaluated in the long direction and results are shown in FIG. 13.

The 0/0/90 symmetric part analyzed in the long, or 0 degree, direction has a thermal expansion coefficient of 31 ppm/° C. below the glass transition temperature and a thermal expansion coefficient of −35 ppm/° C. above it. Depending on the sequence of alignment angles relative to the part axis system, one may achieve any desired in plane thermal expansion coefficients intermediate to the 0 degree and 90 degree values. Composite mechanics provides a way to predict laminate or part properties as a function of layer properties and stacking sequence.

A computer spreadsheet analysis program as described in Tsai, S. W. (1988) *Composite Design 4th Edition*, Ed. S. W. Tsai, Think Composites, Dayton, Ohio was used to perform the composite mechanics calculations. The spreadsheet program was developed to do integrated micro-macro mechanical analysis and is called Mic-Mac. The user enters the material parameters as shown in Table 5. Laminate lay-up sequence and applied stresses or strains are also entered. Some of the variables shown in Table 4 are for micromechanics calculations: estimating matrix and fiber properties from ply properties or vice versa. These calculations weren't of interest in our case but numbers have to be entered, for example, for fiber volume fraction, or the program doesn't run properly. There are also some additional parameters not shown in Table 4 that can be entered for hygrothermal expansion and strength degradation. Moisture absorption was not considered for the N1 resin.

TABLE 5

Material Parameters for Mic-Mac Calculations

| Program Variable | Description | Value entered for N1 resin |
|---|---|---|
| $E_x$, GPa | 0° elastic modulus | 1.8 |
| $E_y$, GPa | 90° elastic modulus | 1.1 |
| $v_x$ | Poisson's ratio | 0.33 |
| $E_s$, GPa | Shear Modulus | 0.45 |
| $E_m$, GPa | Matrix Modulus | 1.1 |
| T/cure | Cure Temperature | 85° C. |
| T/glass | Glass transition temperature | 80° C. |
| X, MPa | 0° tensile strength | 40 |
| X', MPa | 0° compressive strength | 40 |
| Y, MPa | 90° tensile strength | 27 |
| Y' MPa | 90° compressive strength | 27 |
| S, MPa | Shear strength | 20 |
| ρm | Matrix density | 1.2 |
| T/opr | Operation temperature | 25° C. |
| c | Moisture content | 0 |
| F*xy | Normalized interaction term | −0.5 |
| $h_{o, E}{}^{-6}$m | Unit ply thickness | 203 |
| $v_f$ | Fiber volume fraction | 0.6 |

TABLE 5-continued

Material Parameters for Mic-Mac Calculations

| Program Variable | Description | Value entered for N1 resin |
|---|---|---|
| ρ/ply | Ply density | 1.2 |
| η/y | Stress partitioning factor | 0.52 |
| $α_y E^{-6}$ | 0° coefficient of thermal expansion | −17.6 |
| $α_x E^{-6}$ | 90° coefficient of thermal expansion | 179 |
| η/s | Stress Partitioning parameter | 0.316 |
| $E^{iso}$, GPa | Quasi-isotropic stiffness | 1.2 |
| $X^{iso}$, MPa | Quasi-isotropic strength | 32 |

Two operating temperatures were considered: 25° C. and 100° C. the input coefficient of thermal expansion (α) data, the predicted values as a function of part stacking sequence, and the measured values were given in Tables 6 and 7. As shown in Table 5, the composite mechanics program predicts the in-plane thermal expansion coefficient to be 38.7 ppm/° C. in both the x and y directions for the [0/90] symmetric part at 25° C. The measured α's were somewhat higher and not equivalent in the x and y directions. At 100° C. the predicted value for $α_x$ and $α_y$ was 34 ppm/° C. while the measured values were 21.3 and 44.6 respectively.

The [0/090]s part has only been analyzed in the length, or x, direction. At 25° C. the computer mechanics program predicts the in-plane thermal expansion in the x direction to be 17 ppm/° C. while the measured value was 30.7 ppm/° C. At 100° C. there was closer agreement with the predicted value at −30 ppm/° C. and the measured value at −23.3 ppm/° C.

Based on the data for unidirectional parts, the composite mechanics approach provided a reasonable estimate of thermal expansion coefficients of multi-angle parts at different operating temperatures. The apparatus of the present invention needs to have the magnet on a precision controlled turn-table so that alignment angle can be precisely controlled. The process variables such as layer thickness, scan speed, and resin temperature can be evaluated to determine their effect on the degree of alignment attainable.

TABLE 6

Comparison of Measured and Predicted Thermal Expansion Coefficients at 25° C. for Multi-Angle Symmetric Parts

| Part | Ply $a_x a_y$ (ppm/° C.) | Predicted part $a_x a_y$ (ppm/° C.) | Measured part $a_x a_y$ (ppm/° C.) |
|---|---|---|---|
| 16 layer, 0° | — | — | 7.9, 180 |
| [0/90]s part | 7.9, 180 | 38.7, 38.7 | 47.5, 62 |
| [0/0/90]s part | 7.0, 180 | 17.0, 63.0 | 30.7, ($a_y$ not measured) |

TABLE 7

Comparison of Measured and Predicted Thermal Expansion Coefficients at 100° C. for Multi-Angle Symmetric Parts

| Part | Ply $a_x a_y$ (ppm/° C.) | Predicted part $a_x a_y$ (ppm/° C.) | Measured part $a_x a_y$ (ppm/° C.) |
|---|---|---|---|
| 16 layer, 0° | — | — | −117, 342 |
| [0/90]s part | −117, 342 | 34.0, 34.0 | 21.3, 44.6 |
| [0/0/90]s part | −117, 342 | −30, 107.0 | −23.3 ($a_y$ not measured) |

While certain representative embodiments and details have been shown for purposes of illustrating the invention, it will be apparent to those skilled in the art that various changes in the methods and apparatus disclosed therein may be made without departing from the scope of the invention, which is defined in the appended claims.

What is claimed is:

1. A method for producing ordered parts from non-ordered liquid crystal monomer comprising:

a) providing a non-ordered liquid crystal monomer, b) aligning with an external force the molecular orientation within said non-ordered liquid crystal monomer to form an aligned monomer, and c) photopolymerizing the aligned monomer to produce a part, wherein said external force is a magnetic field produced by a rotating permanent magnet, and wherein said part has a build axis and said molecular orientation is aligned at an angle relative to the build axis.

2. The method of claim 1 wherein said part is a layered part having a build axis and the molecular orientation within sections of each layer are aligned by controlling the angle between the magnetic poles of said permanent magnet and the build axis.

3. The method of claim 1 wherein said liquid crystal monomer is a rigid rod monomer in the nematic state.

4. The method of claim 1 wherein a photoinitiator is added to said liquid crystal monomer prior to photopolymerizing.

5. The method of claim 4 wherein said photopolymerization is activated by a light source selected from the group consisting of a lamp, a fiber optic light source, and a laser.

6. The method of claim 5 wherein said light source is exposed through a photolithographic mask.

7. The method of claim 1 further including the step of heating said liquid crystal monomer prior to photopolymerizing.

8. A method for producing ordered parts from non-ordered liquid crystal monomer comprising:

d) providing a non-ordered liquid crystal monomer, e) aligning the molecular orientation within said non-ordered liquid crystal monomer to form an aligned monomer, and f) photopolymerizing the aligned monomer to produce a part, wherein said liquid crystal monomer is provided by drop-on-demand jets.

* * * * *